Sept. 4, 1934.   R. D. WILHELM ET AL   1,972,822
METHOD AND APPARATUS FOR TREATING RUBBER
Filed June 4, 1931    2 Sheets-Sheet 1
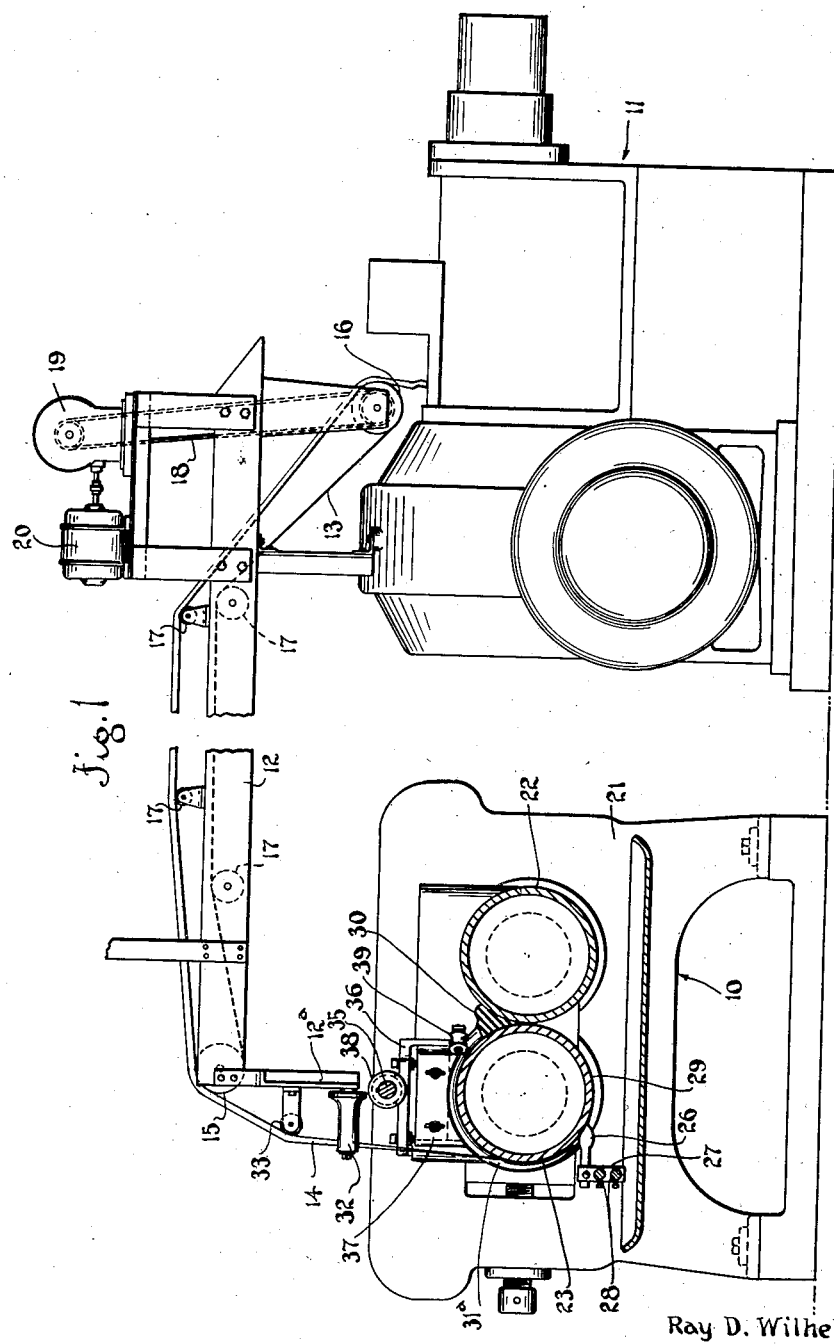
INVENTORS
Ray D. Wilhelm
& Elmer E. Bevan
BY
Ely A Barrow
ATTORNEYS

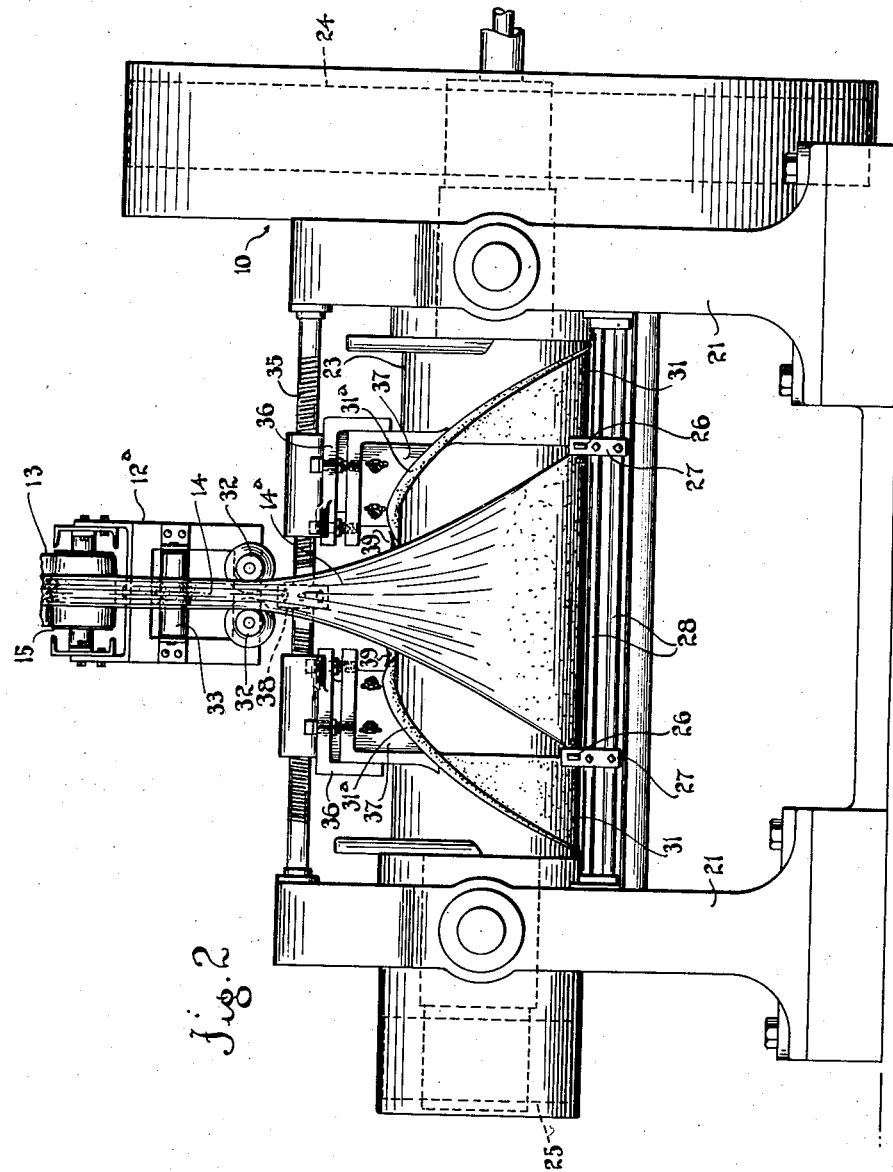

Patented Sept. 4, 1934

1,972,822

UNITED STATES PATENT OFFICE 1,972,822

METHOD AND APPARATUS FOR TREATING RUBBER

Ray D. Wilhelm and Elmer E. Bevan, South Gate, Calif., assignors to The Firestone Tire & Rubber Company, Akron, Ohio, a corporation of Ohio Application June 4, 1931, Serial No. 542,067

5 Claims. (Cl. 18—2)

This invention relates to methods and apparatus for treating rubber, and more especially it relates to procedure and apparatus for warming a batch of unvulcanized rubber composition and delivering a continuous strip of the composition from a determinate portion of the batch to apparatus for effecting further treatment of the composition.

The chief objects of the invention are to produce an improved product; to effect improved mixing and warming of the rubber composition on a warming mill; to provide for the removal only of rubber composition in optimum working condition from the warming mill; and to provide an improved method and improved apparatus for accomplishing the foregoing objects.

Briefly, the invention comprises the removal of a continuous strip of rubber composition from the central region of a sleeve of such composition formed on one of the rolls of a two-roll warming mill, and the concurrent moving of the portions of the sleeve disposed laterally of the central strip, to the central region of the bank of rubber composition between the mill rolls. In the illustrative embodiment of the invention shown in the drawings, the central strip from the warming mill is delivered continuously to an extruding machine, but it will be understood that rubber-working machines other than the extruding machine shown may be employed in its stead.

Of the accompanying drawings,

Figure 1 is a side elevation of apparatus embodying and adapted to carry out the invention, in its preferred form, the warming mill being shown in vertical section; and Figure 2 is an end elevation of the apparatus shown in Figure 1, as viewed from the left thereof.

Referring to Figure 1 of the drawings, 10 is a warming mill and 11 is an extruding machine of usual design positioned adjacent thereto. An overhead framework 12 extends between the two machines and supports an endless conveyor belt 13 adapted to receive a strip of rubber composition 14 from the warming mill 10 and to deliver said strip into the work-receiving opening in the extruding machine 11. The endless belt 13 is mounted upon suitable end-pulleys 15, 16, of which the latter is a driving pulley, and intermediate supporting rollers 17, 17. The pulley 16 is suitably driven by belt or chain 18 from a reduction-gear device 19, the latter being driven by a motor 20. Both the reduction-gear device 19 and motor 20 are suitably supported upon the framework 12.

The warming mill 10 comprises respective end-frames 21, 21, parallel, horizontal, heated rolls 22, 23, a drive-gear 24 (Figure 2) mounted upon the hub of the roll 22 and meshed with a driving pinion on a suitable motor (not shown), and meshed gears 25 on the hubs of the respective rolls 22, 23 for rotating them in unison. A plurality of slitter knives 26, 26, herein shown as two in number, are carried in respective brackets 27 that are slidably mounted for lateral adjustment upon supporting bars 28, 28 the latter being supported at their respective ends by the end-frames 21. The slitter knives 26 are adapted progressively to slit longitudinally the sleeve or sheet of plastic rubber composition 29 formed on the mill-roll 23 from a bank of rubber composition 30 fed into nip of the rolls 22, 23.

The strips of material formed by the slitting of the sheet 29 comprise the central strip 14 and lateral strips 31, 31. Journaled upon a depending portion 12a of the framework 12, over the mill-roll 23, is a pair of spaced apart guide rollers 32, 32 that are horizontally arranged on axes disposed transversely of the axes of the mill-rolls, and above said guide rollers is a single horizontal guide roller 33 disposed parallel to the mill-rolls. The strip of rubber 14 in passing from the mill-roll 23 to the conveyor belt 13 passes between the guide rollers 32 which are spaced closer to each other than the width of the strip and therefore gather the wide flat strip into a relatively narrow, bunched strip as is most clearly shown at 14a in Figure 2. In this condition it passes over the guide roller 33 onto the conveyor belt 13.

The lateral strips 31, 31 formed on the roll 23 are diverted laterally toward the middle of said roll without being removed therefrom. The diverting of the strips is accomplished by mechanism comprising a right and left hand screw 35 journaled at its respective ends upon the end frames 21 of the mill, support brackets 36, 36 mounted upon the respective end portions of said screw, and guide members 37, 37 resembling plows adjustably mounted upon the respective brackets 36 and engaging the surface of the mill-roll 23. The brackets 36 and plows 37 are constructed and arranged so that the latter are disposed obliquely with relation to the surface movement of the mill roll, and thus are adapted to roll each strip 31 laterally and obliquely upon itself from its outer margin toward its inner margin, and to divert the rolled strips 31a thus formed into the bank of stock 30 in a medial region of the latter, which region is of less extent than the width of the strip 14.

The screw 35 is provided with a diametrically apertured flange or collar 38 to receive a suitable tool for rotating the screw to effect lateral adjustment of the brackets 36 and plows 37. Presser rollers 39 supported from the plows 37 engage the rolled strips 31a adjacent the stock bank 30 to prevent movement of the latter from lifting the strips 31a from the mill-roll.

In the operation of the apparatus, the operator feeds unwarmed rubber composition into the bank 30 of the mill at the respective ends thereof, so that the sheet of composition 14 that is subsequently withdrawn from the mill consists of material that has passed at least twice between the mill-rolls. This results in uniformity of warmth in the continuous strip 14, and assures that the strip will have the optimum temperature. The lateral rolling of the strips 31 upon themselves not only facilitates the lateral diverting of the strips, but assists in more intimately commingling the constituent ingredients of the rubber composition.

Because the flat strip 14 is laterally bunched together before it reaches the conveyor belt 13, it has relatively little surface area exposed while on the conveyor and consequently there is less cooling of the strip before it reaches the place of its succeeding treatment.

Modifications may be resorted to without departing from the spirit of the invention as defined by the appended claims, which are not limited wholly to the specific construction shown or exact procedure described.

What is claimed is:

1. The method of treating rubber composition which comprises concurrently warming and sheeting the composition, severing a relatively wide continuous strip from the sheet, progressively gathering the strip into a relatively narrow strip having longitudinal folds in chance arrangement, and feeding the strip longitudinally to the place of subsequent treatment.

2. The method of treating rubber composition which comprises warming and sheeting the composition, severing a relatively wide and thin continuous strip from the sheet, feeding the strip through a relatively narrow opening to laterally contract and longitudinally fold the rubber into a relatively thick-bunched strip, and feeding the strip longitudinally to the place of subsequent treatment.

3. The method of treating rubber composition which comprises warming and sheeting the composition upon a mill-roll, severing the sheet longitudinally to provide a continuous central and laterally disposed strips, removing the central strip from the roll and progressively forcing its lateral margins toward each other to longitudinally gather and fold the strip, and laterally diverting the lateral strips onto the region of the roll originally occupied by the central strip.

4. In apparatus for treating rubber composition, the combination of a warming mill, slitter knives engaging the surface of a roll thereof adapted to sever a rubber sheet formed thereon in continuous strips, and means for removing a strip thereof from the roll, said means including guide rollers adapted to engage the respective margins of the strip to move them toward each other whereby the strip is longitudinally gathered and folded.

5. In apparatus for treating plastic rubber composition, the combination of a warming mill, slitter knives engaging the surface of a roll thereof adapted to sever a sheet of rubber formed on the mill-roll into continuous central and laterally disposed strips, means for removing the central strip from the roll, laterally adjustable plows obliquely engaging the surface of the mill-roll adapted to divert the lateral strips obliquely into the space on the roll previously occupied by the central strip, and presser rollers engaging the work posterior to the plows for holding the work to the mill-roll.

RAY D. WILHELM.
ELMER E. BEVAN.